(12) United States Patent
Lea

(10) Patent No.: US 7,128,166 B2
(45) Date of Patent: Oct. 31, 2006

(54) PLANTING TOOL

(76) Inventor: Gordon E. Lea, 510 Glasgow, Donnelly, MN (US) 56235

( * ) Notice: Subject to any disclaimer, the term of this patent is extended or adjusted under 35 U.S.C. 154(b) by 0 days.

(21) Appl. No.: 10/855,713

(22) Filed: May 27, 2004

(65) Prior Publication Data

US 2004/0256123 A1   Dec. 23, 2004

Related U.S. Application Data

(60) Provisional application No. 60/478,737, filed on Jun. 12, 2003.

(51) Int. Cl.
*A01B 1/00* (2006.01)
(52) U.S. Cl. ............... 172/374; 111/900; 111/92
(58) Field of Classification Search ........ 172/371, 172/374, 41, 21, 22, 373; 111/106, 92, 95, 111/900
See application file for complete search history.

(56) References Cited

U.S. PATENT DOCUMENTS

| | | | | |
|---|---|---|---|---|
| 554,669 A | * | 2/1896 | Field ............... | 111/106 |
| 1,007,241 A | * | 10/1911 | Schlatter ............ | 111/92 |
| 1,077,822 A | * | 11/1913 | Engleman ........... | 111/92 |
| 1,182,913 A | * | 5/1916 | Kollenberg ......... | 111/92 |
| 1,722,063 A | * | 7/1929 | Spitzenberg ........ | 172/371 |
| 3,835,943 A | * | 9/1974 | Bray .................. | 175/135 |
| 4,165,697 A | * | 8/1979 | Yeager et al. ....... | 111/92 |
| 4,934,288 A | * | 6/1990 | Kusiak et al. ....... | 111/92 |
| 5,170,729 A | * | 12/1992 | Benner ............... | 111/7.2 |
| 5,398,624 A | * | 3/1995 | Caron ................. | 111/106 |
| 6,752,219 B1 | * | 6/2004 | Fridd ................. | 172/22 |

* cited by examiner

*Primary Examiner*—Victor Batson
(74) *Attorney, Agent, or Firm*—Patterson, Thuente, Skaar & Christensen, P.A.

(57) ABSTRACT

A planting tool having a handle, an auger receiver and a basket. The auger receiver has an upper opening and a lower opening. The auger receiver is attached to the handle. The auger receiver is adapted to receive an auger. The basket has an upper opening and a lower opening. The basket is slidably attached to the handle for movement between a raised position and a lowered position. When the basket is in the lowered position, the lower opening of the auger receiver is adjacent the lower opening of the basket to define a partially enclosed region between the auger receiver and the basket.

15 Claims, 6 Drawing Sheets

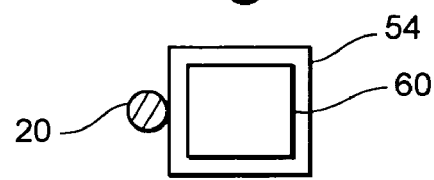
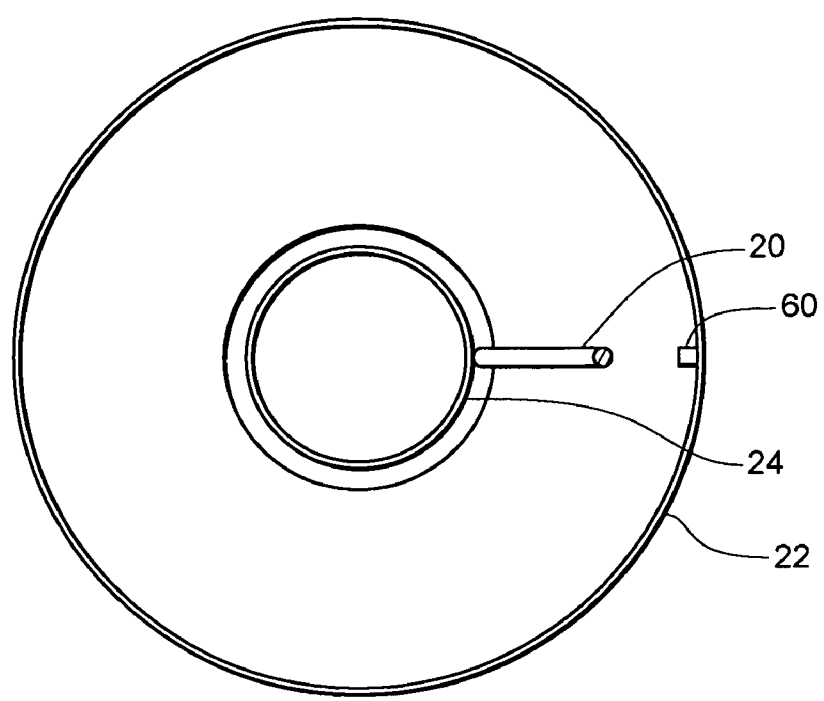

PLANTING TOOL

REFERENCE TO RELATED APPLICATION

The present application claims priority to U.S. Provisional Application No. 60/478,737, filed Jun. 12, 2003. This provisional application is hereby incorporated by reference in its entirety.

FIELD OF THE INVENTION

The present invention relates generally to a gardening tool. More particularly, the present invention relates to a planting tool for planting trees, garden flowers, and plants.

BACKGROUND OF THE INVENTION

In conjunction with digging certain types of holes, it is desirable to form the hole with a circular profile having vertically oriented walls. While it is possible to hand dig these type of holes, it is often easier to form these type of holes with an auger.

While the auger enables relatively deep holes with vertically oriented walls to be formed, conventional augers discharge soil that is removed to form the hole on the ground adjacent to the hole. A portion of the soil typically falls back into the hole after the auger is removed from the hole to thereby reduce the depth of the hole that is available for planting. With conventional augers, there is no way to check the depth of the hole with ease.

Once the plant is placed in the hole, the soil is backfilled around the plant to retain the plant in a stationary position within the hole. Backfilling is typically done with by hand or a shovel or similar implement.

SUMMARY OF THE INVENTION

The present invention is directed to a planting tool having a handle, an auger receiver, and a basket. The auger receiver has an upper opening and a lower opening. The auger receiver is attached to the handle. The auger receiver is adapted to receive an auger. The basket has an upper opening and a lower opening. The basket is slidably attached to the handle for movement between a raised position and a lowered position. When the basket is in the lowered position, the lower opening of the auger receiver is adjacent the lower opening of the basket to define a partially enclosed region between the auger receiver and the basket.

BRIEF DESCRIPTION OF THE DRAWINGS

FIG. 4 is a sectional view of the planting tool taken along a line 4—4 in FIG. 3.

FIG. 5 is a sectional view of the planting tool taken along a line 5—5 in FIG. 3.

DETAILED DESCRIPTION OF THE PREFERRED EMBODIMENTS

The present invention is a planting tool as illustrated at 10 in the Figures. The planting tool 10 generally includes a handle 20 to which a basket 22 and an auger receiver 24 are operably attached.

Figure 1:
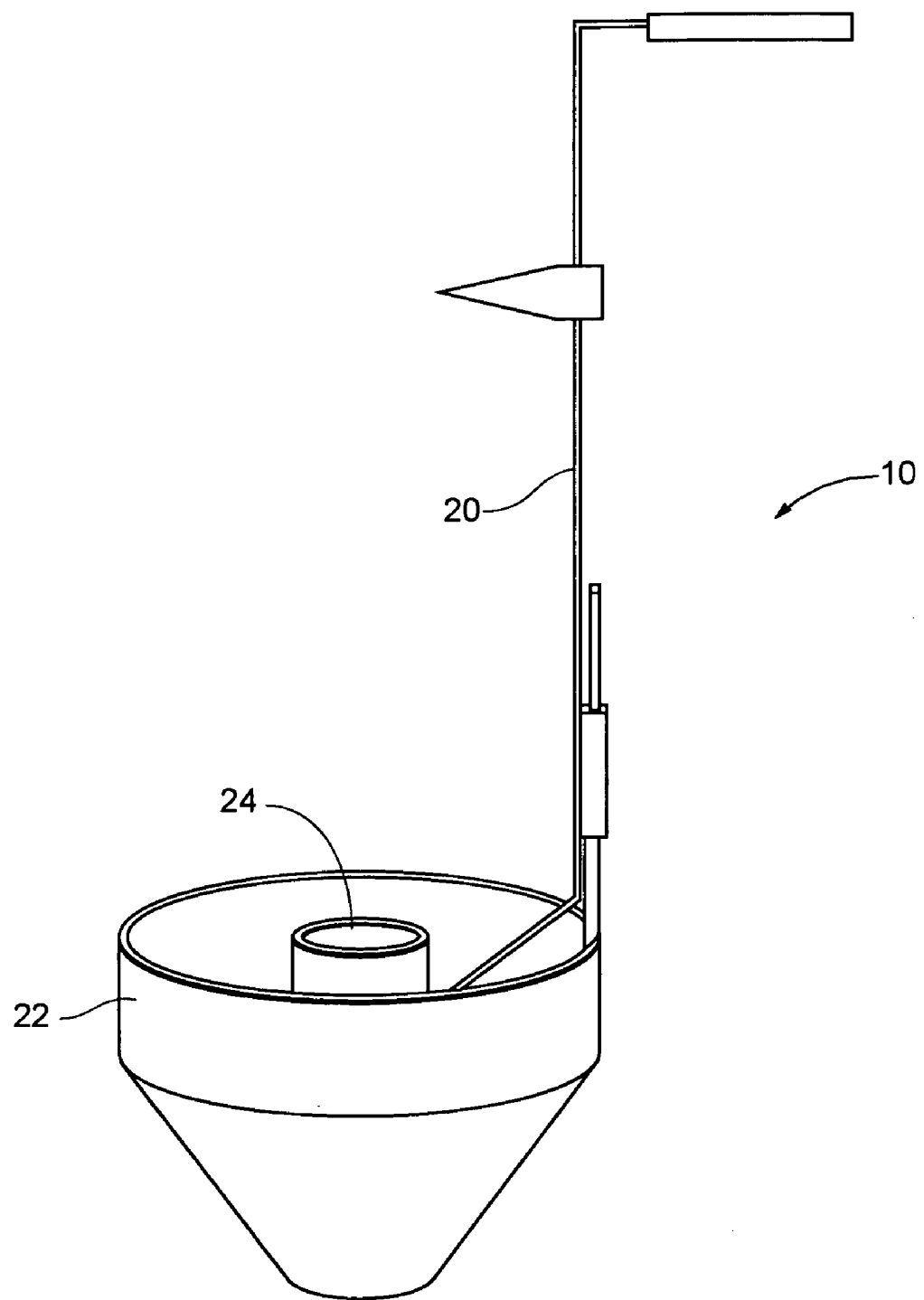
FIG. 1 is a perspective view of a planting tool according to the present invention.
Figure 2:
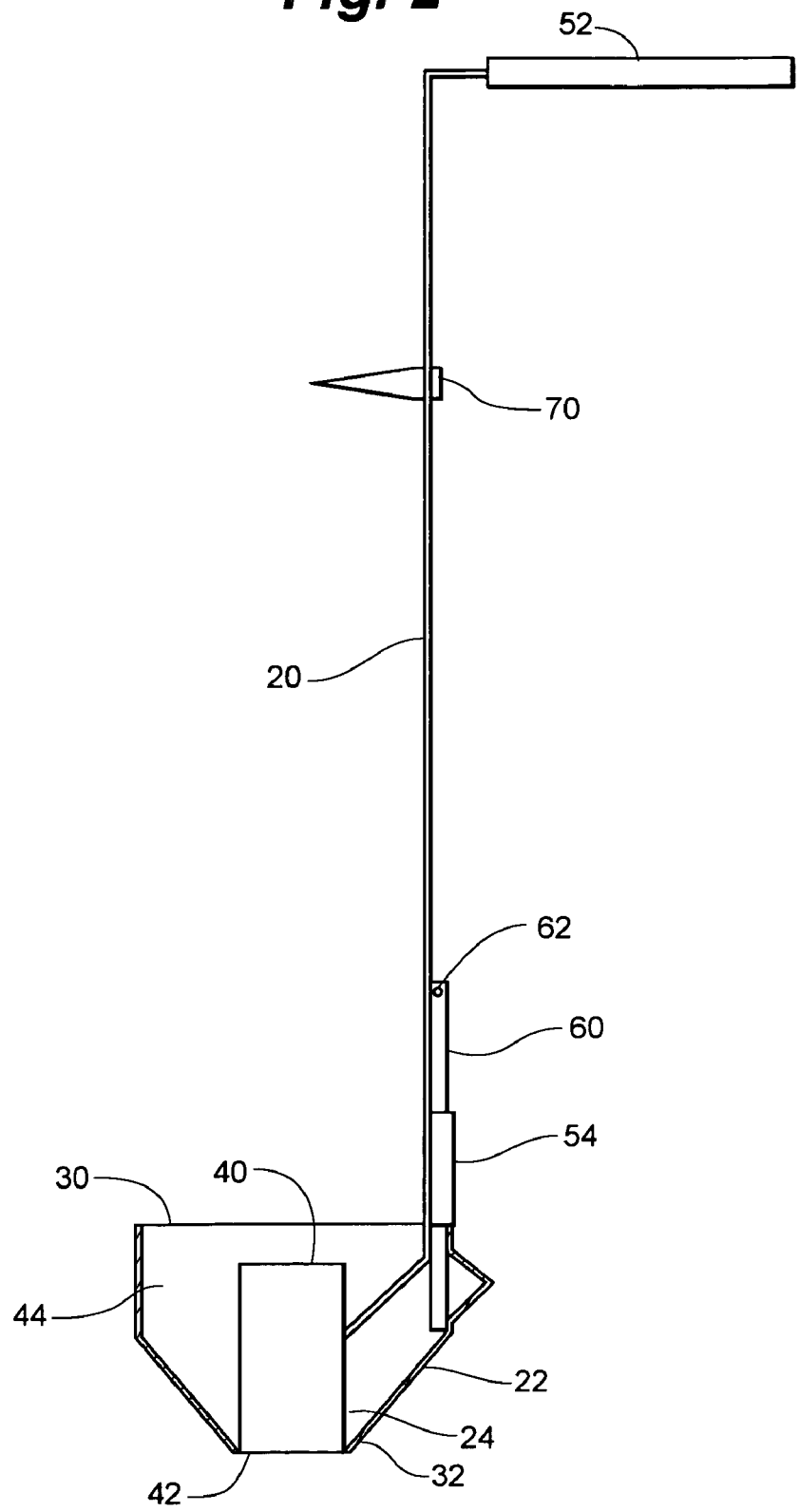
FIG. 2 is a side view of the planting tool in a lowered position.
Figure 3:
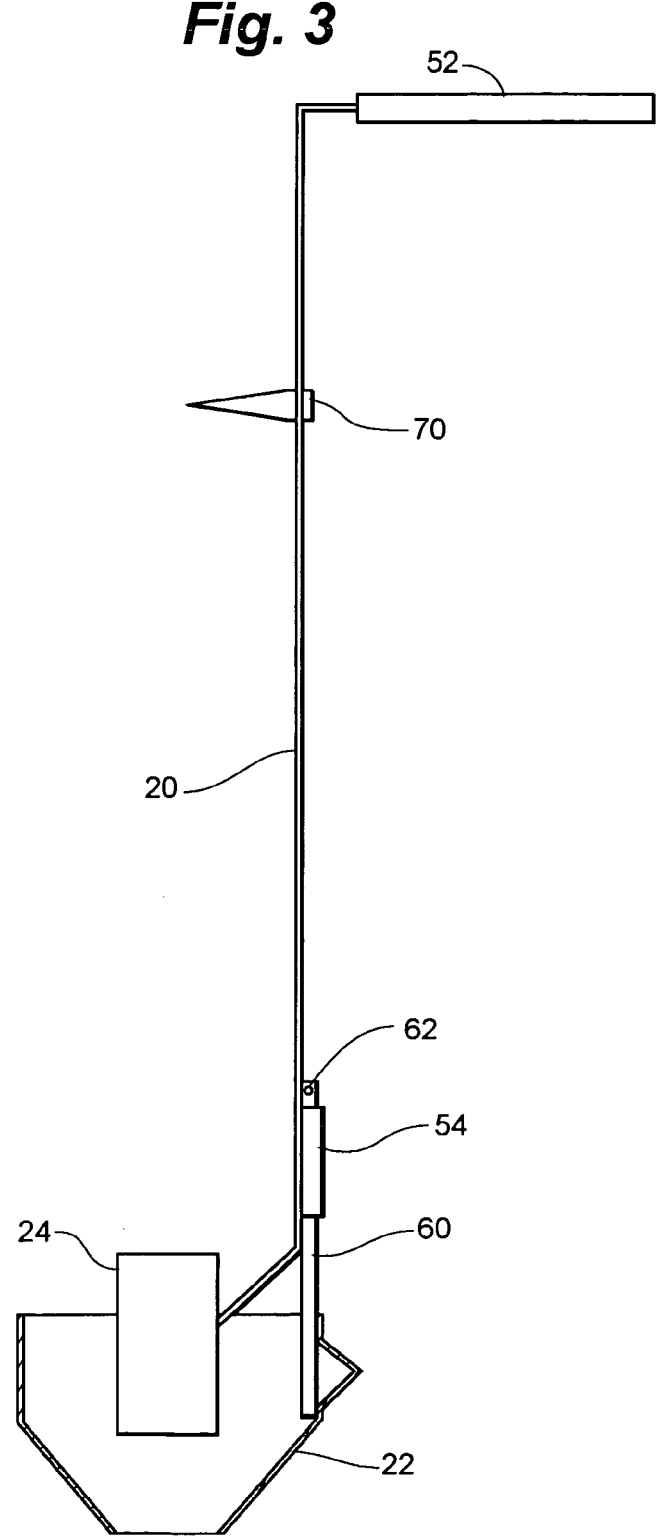
FIG. 3 is a side view of the planting tool in a raised position.
Figure 6:
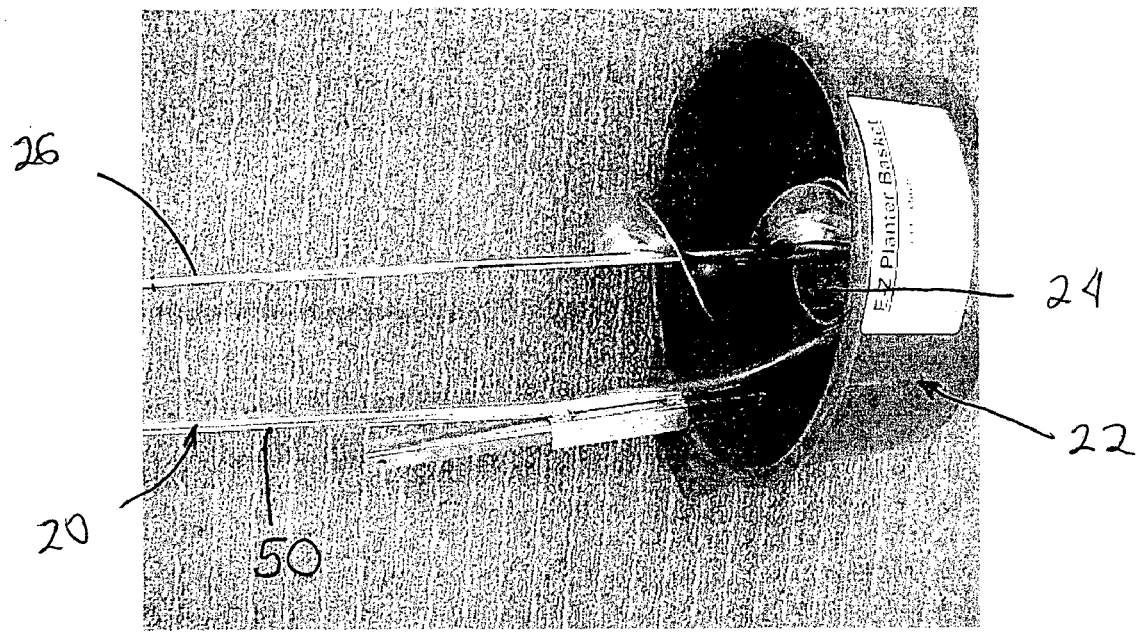
FIG. 6 is a side view of the planting tool used in conjunction with an auger.
Figure 8:
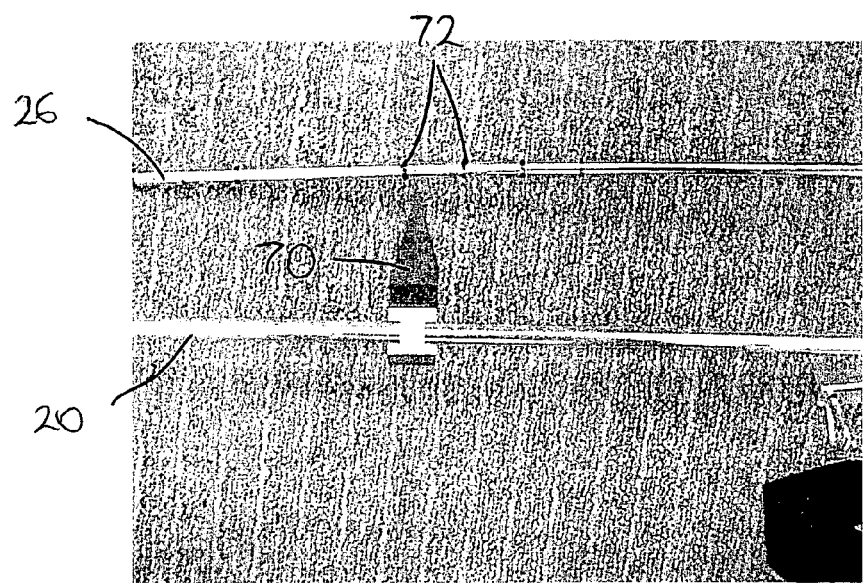
FIG. 8 is a depth gauge for use with the planting tool.

The planting tool 10 is suited for use with an auger 26 (FIGS. 6 and 8). A person of ordinary skill in the art will appreciate that the auger 26 may be manually or electrically powered.

The planting tool 10 is particularly suited for use in digging a hole in which a plant may be placed and then allowing the portion of the hole around the plant to be backfilled. The planting tool 10 of the present invention thereby simplifies the planting process.

The basket 22 preferably has an at least partially conical configuration with an upper opening 30 and a lower opening 32. The upper opening 30 preferably has a larger diameter than the lower opening 32.

Dimensions of the basket 22 are selected based upon the diameter and depth of the hole that is to be formed so that the dirt removed from the hole is retained in the basket 22. For many applications, the basket 22 has a height of between 6 and 12 inches, a diameter of the upper opening 30 of between 6 and 12 inches, and a diameter of the lower opening 32 of between 2 and 6 inches.

The auger receiver 24 preferably has a cylindrical configuration with an upper opening 40 and a lower opening 42 that both preferably have an approximately equal diameter. The diameter of the auger receiver lower opening 42 is approximately the same as the diameter of the basket lower opening 32. A height of the auger receiver 24 is preferably less than a height of the basket 22.

When the auger receiver 24 is in the lowered position, the auger receiver lower opening 42 is adjacent the basket lower opening 32 to thereby define a partially enclosed region 44 that extends between the basket 22 and the auger receiver 24. An upper end of the partially enclosed region 44 is preferably open and a lower end of the partially enclosed region 44 is closed to retain soil in the partially enclosed region 44.

The auger receiver 24 has a diameter that is approximately the same as an auger 26 that is used with the planting tool 10. This configuration causes dirt that is dug out with the auger 26 to be conveyed out of the hole until the dirt is above the auger receiver upper opening 40. The dirt is then discharged into the partially enclosed region 44 where the dirt is retained until it is used for backfilling the hole.

The handle 20 generally includes an elongated portion 50 and a gripping portion 52. The elongated portion 50 is selected with a length that enables the planting tool 10 to be operated from a standing position. A person of ordinary skill in the art will appreciate that the elongated portion 50 may be fabricated from two or more sections that not only enable the length of the handle 20 to be adjusted but also enable the handle 20 to be disassembled for packaging and distribution.

The gripping portion 52 extends from the elongated portion 50 opposite the auger receiver 24. The gripping portion 52 is preferably shaped to conform to at least a portion of a person's hand that is using the planting tool 10 to facilitate using the planting tool 10 for extended periods of time.

The handle 20 is attached to an outer surface of the auger receiver 24 proximate a lower end of the elongated portion 50. A handle guide tube 54 is attached to the elongated portion 50 intermediate the gripping portion 52 and the auger receiver 24.

The handle guide tube 54 preferably has a generally vertically oriented guide aperture 56 extending therethrough. While the handle guide tube 54 is susceptible to a variety of configurations, the handle guide tube 54 preferably has a substantially square profile.

The guide aperture 56 is adapted to receive a basket guide bar 60 that extends from the basket 22. The basket guide bar 60 is preferably formed with a profile that is similar to the handle guide tube 54. Forming the handle guide tube 54 and the basket guide bar 60 each with a substantially square profile prevents the basket guide bar 60 from rotating with respect to the handle guide tube 54.

The basket guide bar 60 is vertically slidable with respect to the handle guide tube 54. A retainer 62 is preferably attached to an upper end of the basket guide bar 60 to limit the distance at over which the basket guide bar 60 is slidable with respect to the handle guide tube 54 and thereby operably mounts the basket 22 to the auger receiver 24.

As a result of this configuration, when the basket 22 is placed on the ground and the gripping portion 52 is lowered, the auger receiver lower opening 42 is adjacent the basket lower opening 32 to define the partially enclose region 44 when digging the hole. Lifting the gripping portion 52 causes the handle guide tube 54 to slide with respect to the basket guide bar 60 and thereby results in the auger receiver 24 being lifted with respect to the basket 22 and thereby allows dirt to pass through the lower opening 32.

Figure 7:
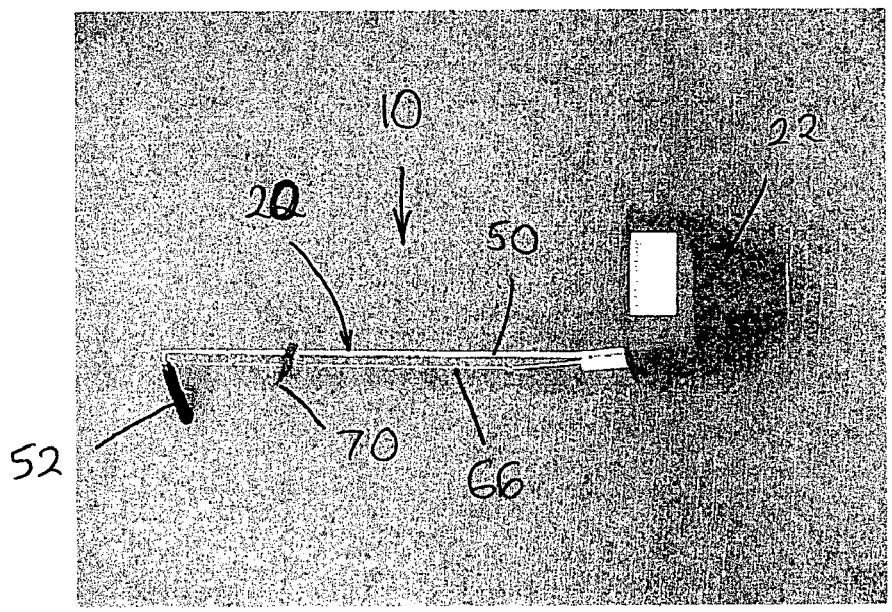
FIG. 7 is a side view of an alternative configuration of the planting tool.

In an alternative configuration, an extension 66 is attached to an upper end of the basket guide bar 60, as illustrated in FIG. 7. The extension 66 extends to proximate the gripping portion 52.

In this configuration, the user may grasp the extension 66 and thereby retain the auger receiver 24 in a stationary position with respect to the basket 22 as the planting tool 10 is lifted off the ground. This embodiment is useful where it is not desired to backfill the hole or where the amount of dirt removed from the hole is significantly more than the dirt need to backfill the hole after planting.

To facilitate forming holes with a desired depth, a depth gauge 70 is preferably attached to the handle 20, as most clearly illustrated in FIG. 8. The depth gauge 70 preferably has a triangular shape with a frictionally engages the handle 20 to enable the position of the depth gauge 70 to be adjusted depending on the desired planting conditions.

The auger 26 includes a plurality of lines 72 that are used in conjunction with the depth gauge 70 for determining when the appropriate depth of the hole has been reached.

In operation, as initial step in using the planting tool 10, the depth gauge 70 is moved to a desired position on the auger. The planting tool 10 is placed on the ground where it is desired to place the plant. The auger 26 is inserted into the auger receiver 24 and then operated to dig the hole. Once the hole has been dug to a desired depth, the auger 26 is removed from the auger receiver 24. Dirt is discharged from the auger 26 into the partially enclosed region 44.

The plant is inserted into the hole through the auger receiver 24. The handle 20 is raised to move the auger receiver lower opening 42 away from the basket lower opening 32. When this occurs, dirt that was retained in the partially enclosed region 44 passes through the basket lower opening 32 to backfill the portion of the hole that is not filled by the plant.

The process of the present invention not only enhances the rate at which plants may be planted but also reduces the mess generated in the planting process because the dirt is retained in the partially enclosed region 44 during the planting process. The present invention also enables dirt that is not needed in the planting process to be easily discarded.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A planting tool comprising:
   a handle;
   an auger receiver having an upper opening and a lower opening, wherein the auger receiver is slidably attached to the handle for movement between a raised position and a lowered position, wherein the auger receiver is adapted to receive an auger; and
   a basket having an upper opening and a lower opening, wherein when the auger receiver is in the lowered position, the lower opening of the auger receiver is adjacent the lower opening of the basket to define a partially enclosed region between the auger receiver and the basket, wherein the handle comprises an elongated portion and a gripping portion that is attached to the elongated portion opposite the auger receiver and wherein the auger receiver is attached to the handle with a handle guide tube and a basket guide bar, wherein the handle guide tube is attached to the elongated portion, wherein the basket guide bar is attached to the basket, and wherein the handle guide tube and the basket guide bar slidably engage each other.

2. The planting tool of claim 1, wherein the handle guide tube and the basket guide bar each have a square profile.

3. The planting tool of claim 1, and further comprising an extension that is attached to the basket guide bar.

4. A kit for planting comprising:
   an auger; and
   a planting tool comprising:
      a handle;
      an auger receiver having an upper opening and a lower opening, wherein the auger receiver is attached to the handle, wherein the auger receiver is adapted to receive an auger; and
      a basket having an upper opening and a lower opening, wherein the auger receiver is slidably attached to the handle for movement between a raised position and a lowered position, when the auger receiver is in the lowered position, the lower opening of the auger receiver is adjacent the lower opening of the basket to define a partially enclosed region between the auger receiver and the basket.

5. The planting tool of claim 4, wherein the handle comprises an elongated portion and a gripping portion that is attached to the elongated portion opposite the auger receiver.

6. The planting tool of claim 5, wherein the auger receiver is attached to the handle with a handle guide tube and a basket guide bar, wherein the handle guide tube is attached to the elongated portion, wherein the basket guide bar is attached to the basket, and wherein the handle guide tube and the basket guide bar slidably engage each other.

7. The planting tool of claim 6, wherein the handle guide tube and the basket guide bar each have a square profile.

8. The planting tool of claim 6, and further comprising an extension that is attached to the basket guide bar.

9. The planting tool of claim 4, wherein the upper opening of the basket has a diameter that is greater than the lower opening of the basket.

10. The planting tool of claim 4, and further comprising a depth gauge that is attached to the handle.

11. A method of planting comprising:
 providing a planting tool having a handle, an auger receiver and a basket, wherein the auger receiver has an upper opening and a lower opening, wherein the auger receiver is attached to the handle, wherein the auger receiver is adapted to receive an auger; wherein the basket has an upper opening and a lower opening, and wherein the auger receiver is slidably attached to the handle for movement between a raised position and a lowered position;
 placing the planting tool on a ground surface where it is desired to plant such that the lower opening of the auger receiver is adjacent the lower opening of the basket to define a partially enclosed region between the auger receiver and the basket;
 forming a hole beneath the auger receiver using an auger that is extended through the auger receiver;
 depositing dirt removed from the hole in the partially enclosed region;
 placing a plant in the hole; and
 backfilling a portion of the hole that is adjacent the plant by lifting the handle, which causes the auger receiver to move away from the basket.

12. The method of claim 11, wherein the handle comprises an elongated portion and a gripping portion that is attached to the elongated portion opposite the auger receiver.

13. The method of claim 12, wherein the auger receiver is attached to the handle with a handle guide tube and a basket guide bar, wherein the handle guide tube is attached to the elongated portion, wherein the basket guide bar is attached to the basket, and wherein the handle guide tube and the basket guide bar slidably engage each other.

14. The method of claim 13, and further comprising attaching an extension to the basket guide bar.

15. The planting tool of claim 14, and further comprising attaching a depth gauge to the handle.

* * * * *